United States Patent [19]

Ericksen

[11] Patent Number: 5,628,538
[45] Date of Patent: May 13, 1997

[54] EXTENSIBLE WADING STAFF WITH RETRACTABLE HOOK

[76] Inventor: Marc W. Ericksen, 38 Don Gabriel Way, Orinda, Calif. 94563

[21] Appl. No.: 330,255

[22] Filed: Oct. 27, 1994

Related U.S. Application Data

[63] Continuation-in-part of Ser. No. 238,270, May 4, 1994, abandoned.

[51] Int. Cl.⁶ .............................. A01K 97/00; A47F 13/06
[52] U.S. Cl. ............................. 294/19.1; 294/26; 43/4; 43/17.2
[58] Field of Search ............... 43/4, 5, 17.2; 294/17.1, 294/19.1, 19.3, 26

[56] References Cited

U.S. PATENT DOCUMENTS

| | | |
|---|---|---|
| 1,208,624 | 12/1916 | Newman . |
| 1,623,497 | 4/1927 | Rurup . |
| 1,851,370 | 3/1932 | Munger . |
| 2,590,595 | 3/1952 | Ziebell .............................. 43/5 |
| 3,006,678 | 10/1961 | Johnson . |
| 3,150,460 | 9/1964 | Dees . |
| 3,311,398 | 3/1967 | Erhardt . |
| 3,467,116 | 9/1969 | Ringewaldt . |
| 4,004,539 | 1/1977 | Wesson . |
| 4,086,718 | 5/1978 | Swanson et al. . |
| 4,263,864 | 4/1981 | Carter, Jr. et al. . |
| 4,438,620 | 3/1984 | Beardsley . |
| 4,720,932 | 1/1988 | Bovino . |
| 4,793,646 | 12/1988 | Michaud, Jr. . |
| 4,881,338 | 11/1989 | Lung . |

FOREIGN PATENT DOCUMENTS

| | | |
|---|---|---|
| 578501 | 6/1959 | Canada . |
| 181906 | 6/1922 | United Kingdom . |

OTHER PUBLICATIONS

Jim Freeman, *California Trout*, pp. 21–22 and 187, Copyright 1983.

*Primary Examiner*—Kurt Rowan
*Attorney, Agent, or Firm*—Kolisch, Hartwell, Dickinson, McCormack & Heuser

[57] ABSTRACT

The invented extensible wading staff includes an elongate shaft with first and second ends, a gripping area, a retractable hook near the first end, and a foot structure such as a rubber cap on the sealed end. A fisherman who is in water, especially moving water, may use the wading staff to maintain his balance while he is flyfishing. In addition, a fisherman may use the staff to help him retrieve snagged fishing devices such as flies, lures, lines and hooks from overhanging tree branches or underwater obstacles.

15 Claims, 4 Drawing Sheets

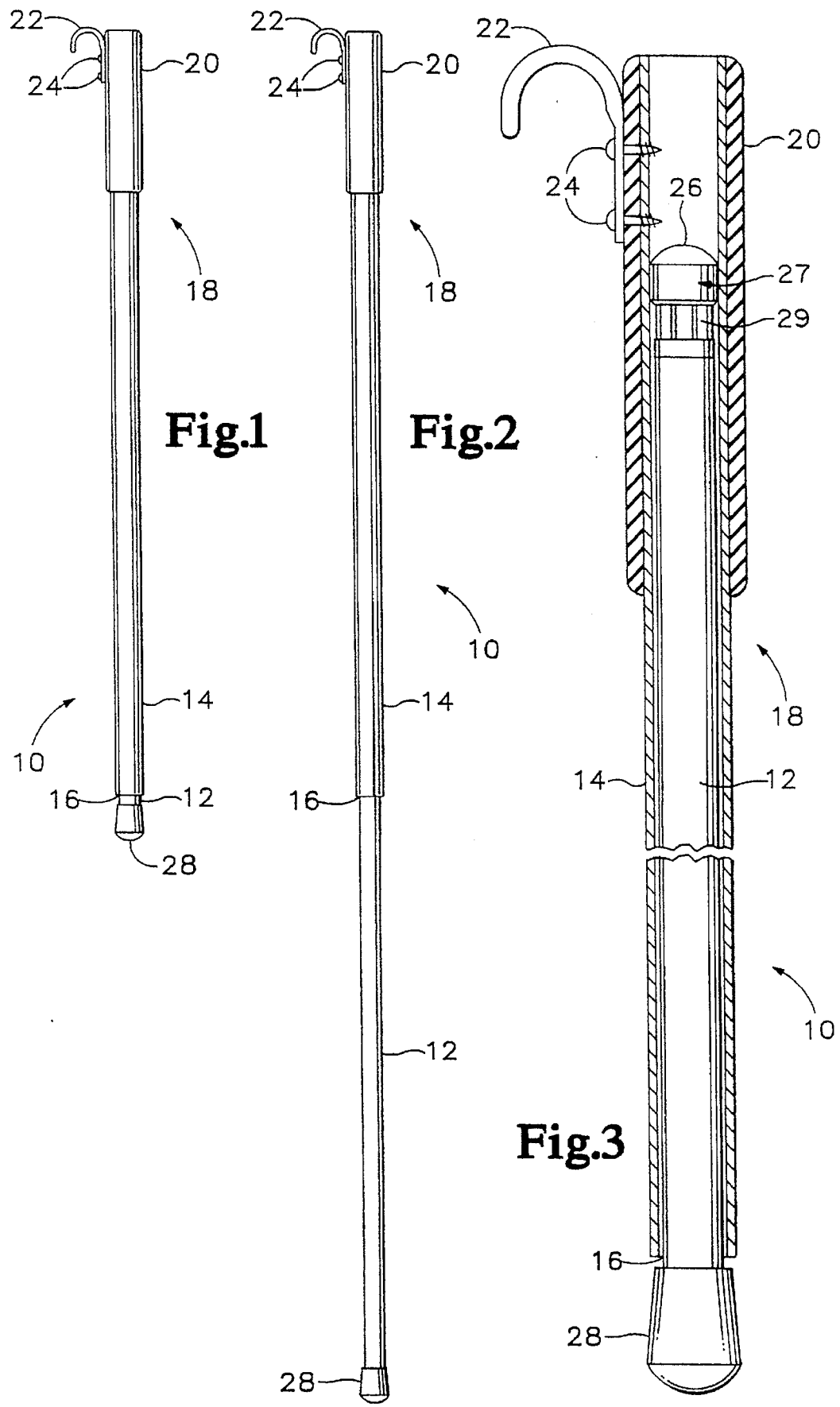

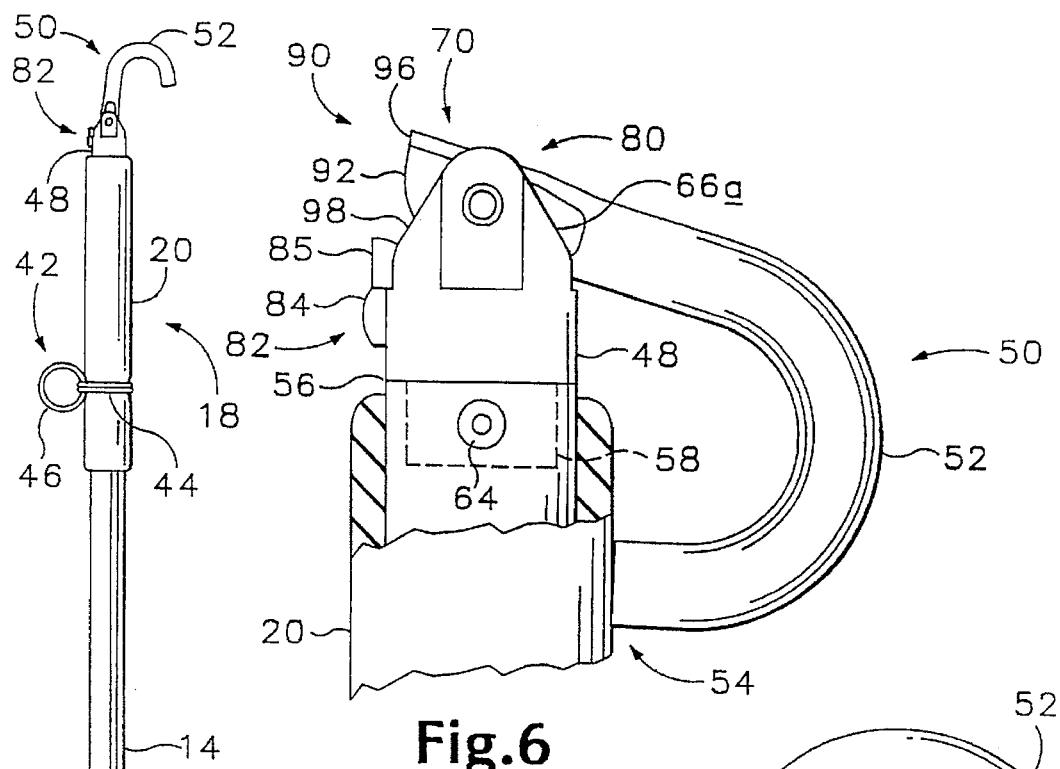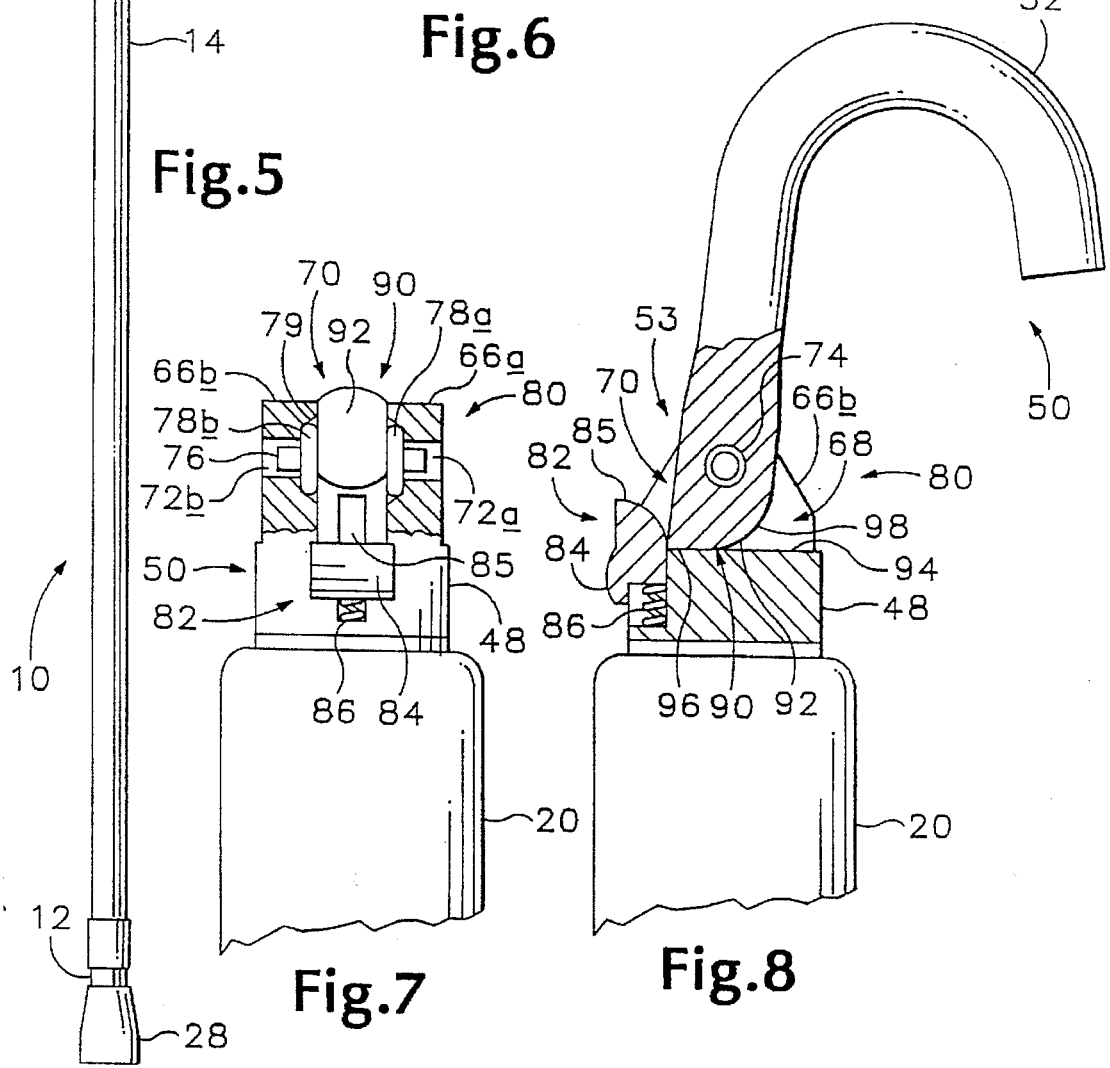

EXTENSIBLE WADING STAFF WITH RETRACTABLE HOOK

This application is a continuation-in-part of application Ser. No. 08/238,270, filed May 4, 1994 now abandoned.

FIELD OF THE INVENTION

The present invention relates generally to fishing equipment. More particularly, the invention relates to a staff used by a fisherman wading in water as a stabilizing support and as a tool to retrieve snagged fishing devices. It also relates to methods of retrieving snagged fishing devices.

BACKGROUND ART

Flyfishing is an outdoor sport enjoyed by many people. When flyfishing, a fisherman uses a fly tied on the end of a line attached to a rod and reel. A fisherman wades into shallow water or stands very near a bank of a body of water and he repeatedly casts his fly upon the water. A fish swimming in the water is tricked into thinking that the fly landing on the water is a real fly or bug.

It is common for a fisherman to fish in a briskly moving stream or river and quite often a fisherman will wade into water to get closer to an area where he is more likely to catch fish. When wading into the water, a fisherman may find it difficult to maintain his balance on rocky bottoms or in fast currents and may choose to use a wading staff for a stabilizing support. Wading staffs are commercially available and appear in two basic varieties: (1) an unextensible single piece of solid material such as metal or wood; and (2) extensible by either telescoping or collapsing the staff. The key advantage of an extensible staff over an unextensible one is ease of portability provided by reducing the size of the staff.

Trees or shrubs are often found in or near the water where fishermen fish. Often, the flies, lines, hooks, lures, etc. of the fisherman may become snagged in overhanging branches when the fisherman casts. If the fly is snagged in a branch that is beyond the fisherman's reach, he may lose the fly by inadvertently breaking the fishing line or by cutting the fishing line in frustration. This can cause a loss of time and money because flies can cost $1 to $3 or more, and it may take several minutes to tie or replace a fly onto the line. A need exists for a tool to help retrieve snagged flies, lines, hooks, lures, etc. that are out of the fisherman's reach.

The invention described in this document provides the dual function of a wading staff, which may be used as a stabilizing support for a fisherman wading in water, and a tool to retrieve snagged flies, lures, hooks or other fishing devices.

SUMMARY OF THE INVENTION

The invention includes an extensible shaft made from two rods, where a first rod telescopes into a second, hollow rod. The rods may be fixed into position relative to each other by a lock, such as a cam, that engages the inner surface of the second rod when the first tube is twisted. The two rods together define the extensible shaft.

The extensible shaft has two ends. A handle, which facilitates gripping of the shaft while wading in water, and a hook are located near a first end. A foot structure, such as a rubber cap, is mounted to the shaft's second end to allow the shaft to be used as a wading support. While flyfishing, the fisherman may use the shaft as a stabilizing support by gripping the handle and placing the second end with the rubber cap onto the ground for support. The shaft may be extended to varying lengths to support various sloping terrain and it may be retracted for storage.

The staff may also be used to retrieve snagged fishing devices such as flies, lines, lures and hooks from overhanging branches by extending it the appropriate length, raising it towards the branch, hooking it over the branch and then pulling it down so that the snagged fishing device may be recovered. The staff may also be used to retrieve fishing devices snagged under water.

In one embodiment of the invention, the hook is retractable. Thus, it may be retracted or closed when not in use. The hook is retracted to prevent accidentally snagging or hooking something as the fisherman walks or fishes, and to provide a more compact and versatile staff.

BRIEF DESCRIPTION OF THE DRAWINGS

FIG. 1 is an elevation view of the unextended wading staff.

FIG. 2 is an elevation view of the extended wading staff.

FIG. 3 is an enlarged scale, partially-sectional view of the unextended wading staff.

FIG. 5 is an elevational view of the unextended wading staff with a retractable hook.

FIG. 6 is an enlarged scale, side view of the retractable hook of FIG. 5, with the hook in a retracted or closed position.

FIG. 7 is a partially cross-sectional, rear view of the retractable hook of FIGS. 5 and 6.

FIG. 8 is a partially cross-sectional, side view of the retractable hook of FIGS. 5-7, with the hook in an open position.

DETAILED DESCRIPTION AND BEST MODE OF CARRYING OUT THE INVENTION

Figure 4:
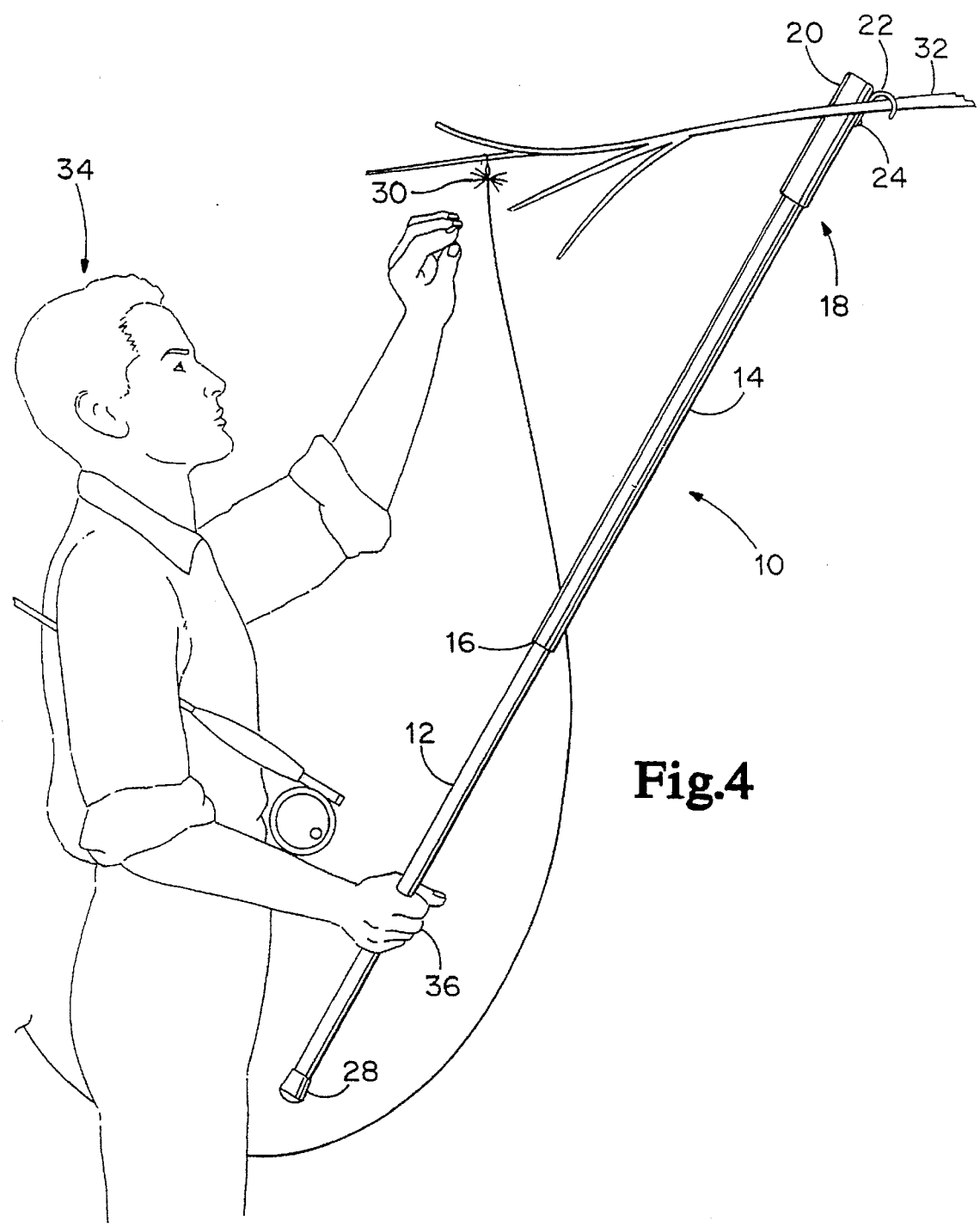
FIG. 4 is a perspective view of the invention showing it being used by a fisherman to retrieve a snagged fly.

Two embodiments of the invented wading staff are shown in FIGS. 1-9. One embodiment is shown in FIGS. 1-4, and the other in FIGS. 5-9. The staff is useful for fisherman to hold onto as a stabilizing support while he is wading in water and as a tool to help the fisherman to retrieve snagged fishing devices. A retractable hook is useful to avoid unintentional hooking or snagging when the fisherman is fishing or walking.

The staff may be seen to include a shaft generally indicated at 10. The shaft 10 preferably includes two rods 12 and 14 where one rod telescopes into the other rod. FIG. 1 shows the shaft 10 with the lower rod 12 fully telescoped within the upper rod 14 and having an overall length of 4½ feet and FIG. 2 shows the shaft 10 with the lower rod 12 fully extended and telescoped out of the upper rod 14 and having a length of 8 feet 4 inches. The rods are constructed out of aluminum in this embodiment because it is lightweight, strong, rigid and will not rust. However, the rods may be constructed out of any rigid material such as metal, wood or plastic. The upper rod 14 is hollow and has a larger diameter than the lower rod 12 to allow the lower rod 12 to telescope or slide within the upper rod 14 at 16. This embodiment uses tubes for the rods to promote the lightweight nature of the staff without sacrificing its sturdiness. Many characteristics of the shaft may be changed or altered in alternative embodiments, without changing the functionality of the invention as described in this document, e.g., width of the tubular rods, width of the rods themselves, length of the rods, number of rods used, and actual method of extensibility. Rather than using telescoping as a means of extending the length of the shaft, it is possible to use other means or methods, such as collapsibility. A collapsible shaft could have a shock cord and two or more hollow rods.

On the top portion of the upper rod is a gripping area 18 where a person wading in water can hold onto the wading staff for stabilizing support. Within this gripping area is a handle 20 which completely wraps around the upper portion of the upper rod 14. In this embodiment, the handle is foam rubber, replaceable and fictionally grips the rod. Foam rubber provides a highly tactile gripping surface when it is wet or dry. The handle can be molded with finger recesses to aid in the gripping of the staff.

Also attached to the upper rod 14 is a hook 22. In the embodiment shown in FIGS. 1–4, hook 22 is attached to the side and near the end of the upper rod 14 as shown in FIGS. 1–4. The hook has a flat portion with two holes in it where the hook attaches to the rod. To attach the hook to the rod, screws 24 are threaded through the holes and through matching holes in the handle 20 and the upper rod 14. The hook 22 forms an approximate half circle. In this embodiment, the hook's diameter is approximately 1½ to 3 inches. Of course, other diameters may be used. The hook configuration and size facilitate using the staff to hook branches. Hook 22 may be attached anywhere near the top portion of the upper rod 14, and may also extend from the very end of the upper rod 14. The hook may be made out of any rigid material such as plastic, wood or metal. In this embodiment, the hook is made of aluminum.

Another embodiment of the invented wading staff is shown in FIGS. 5–9 collectively. This embodiment has a retractable hook structure which is generally indicated at 50.

Figure 9:
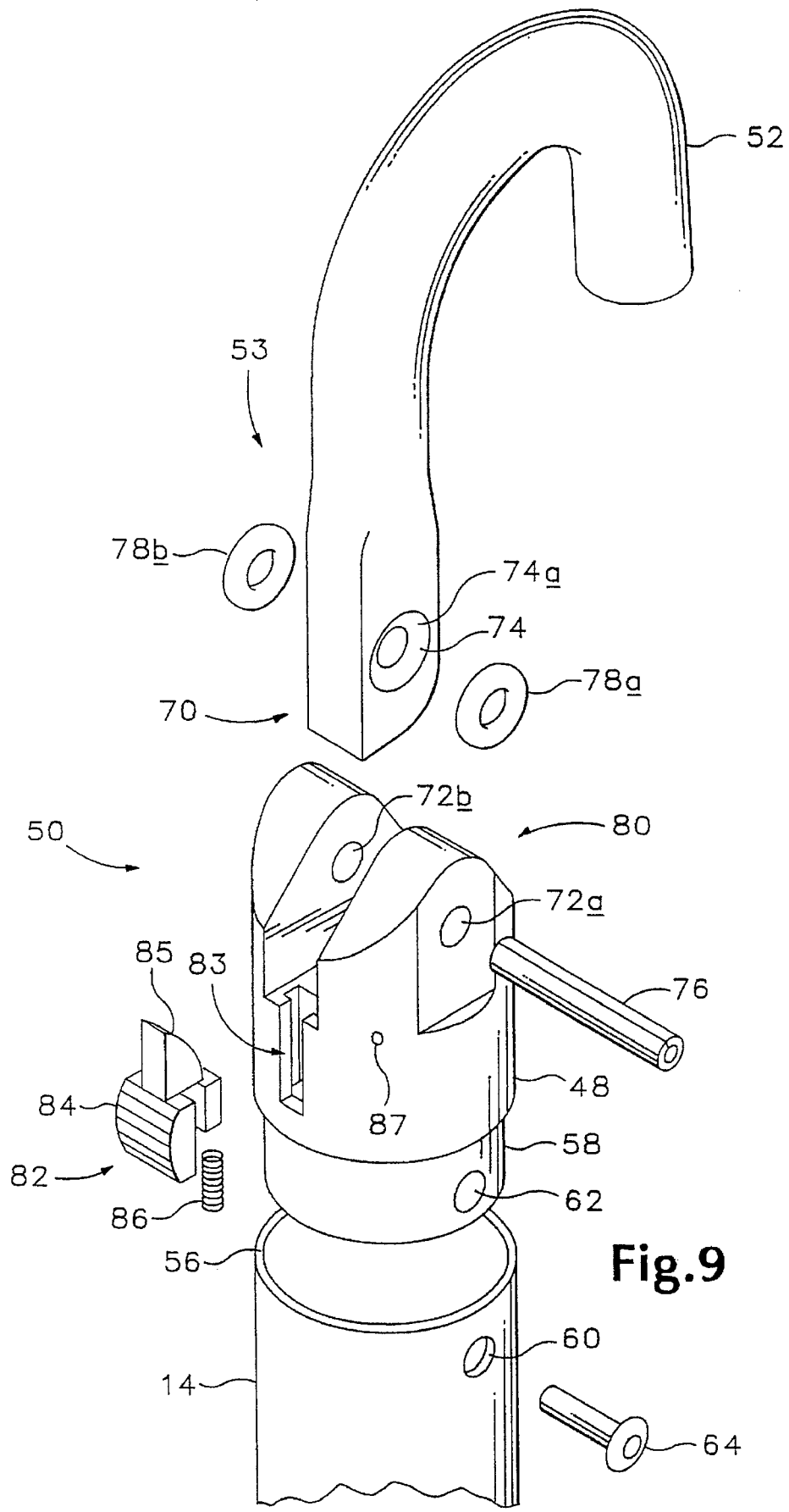
FIG. 9 is an exploded view of the retractable hook.

The two main parts of retractable hook structure 50 are bracket 48 and hook 52. FIGS. 5, 8 and 9 show the hook in its open or extended position, while FIGS. 6 and 7 show the hook in its closed or retracted position.

FIGS. 6–8 show partially cross-sectional views of retractable hook structure 50, and FIG. 9 shows an exploded view of the same structure. These figures reveal the structural detail of the retractable hook structure. In this embodiment, the first end of the staff is tubular and has a circular opening 56. Bracket 48 has a cylindrical, tubular neck shown at 58 in FIGS. 6 and 9. The neck has diameter slightly less than the diameter of opening 56 to allow it to fit snugly into the opening.

Upper rod 14 has a small hole 60 near or adjacent opening 56, and bracket 48 has a corresponding hole 62 that matches hole 60 when neck 58 is fitted into opening 56. A member 64 is inserted through holes 60, 62 to securely hold the bracket to and within the staff. Preferably, member 64 is a rivet; however, other suitable, reliable fastening members may be used, such as a bolt and nut, a screw, a pin, etc. Also, the bracket could be attached to the staff using some other means other than holes with a rivet therethrough without departing from the spirit and the scope of the invention.

Bracket 48 has two generally parallel arms 66a, 66b extending up and away from the staff. The two arms are positioned apart to form a space 68 between them. Space 68 is large enough to accommodate hook 52. Hook 52 includes a substantially straight portion 53 with a first end or base 70. Space 68 is large enough to accommodate end 70.

Each arm 66a, 66b has a collinear bore 72a, 72b extending through them, and the axis of which is perpendicular to the longitudinal axis of the shaft. Base 70 of hook 52 has a corresponding inset counter-sink bore 74. The diameter of bores 72a, 72b, 74 are substantially equal and small enough to accommodate the insertion of pin 76. Preferably, the pin is a tension spring axle.

Hinge 80 is formed when base 70 of hook 52 is inserted into space 68 between arms 66a, 66b and pin 76 is inserted through bores 72a, 72b and 74. Hook 52 pivots around pin 76.

O-rings or grommets 78a and 78b are placed on either side of base 74 to allow pin 76 to extend through the grommets as well as the arms and the base. In this embodiment, the grommets are constructed from rubber or other elastomeric material to further their purpose which is to buffer the intrusion of sand and grit into the hinge. Sand and grit in the hinge could cause the hook and bracket to gall against each other and the grommets help ameliorate the effect of such galling. Base 70 of the hook may include two, opposed insets to receive the grommets, one on each outer side of base 70, as shown at 74a in FIG. 9. Alternatively, the insets may be in the inner surfaces of arms 66a and 66b, as shown in FIG. 6 at 79.

Base 70 of the hook includes a stop 90 to prevent the hook from pivoting open beyond the position shown in FIG. 8. Stop 90 includes a sloped surface generally indicated at 92. Bracket 48 includes a corresponding contact surface 94. FIG. 8 also shows that stop 90 includes a first edge 96 and a second edge 98. The first edge is farther away from the hinge's rotational axis than the second edge. The stop functions by the sloping surface and first edge contacting the bracket as shown in FIG. 8, thereby limiting the rotation or pivot of hook 52.

In either embodiment of the staff, hook 22 or hook 52 may be magnetized. A fisherman may be wading through waist-deep or chest-deep water in an effort to catch a fish or cross a stream. If the fisherman was to drop a metallic object, like a fly or a tool, into water of such depth, it would be extreme difficult, inconvenient, and maybe potentially dangerous to go underwater to retrieve the metallic object. The fisherman can easily and safely retrieve the metallic object by using the present invention with a magnetized hook.

FIGS. 5–9, collectively, also show a latch mechanism at 82 for locking the hook and preventing it from closing or retracting once the hook is in the open or extended position. Latch mechanism 82 includes a spring loaded locking cog 84, positioned in a T-shaped track 83 formed in the bracket, with a spring 86 positioned within the track at its bottom and biasing the locking cog upward. The bracket may also include a locking cog set punch 87, which is used to prevent the locking cog from coming out of track 83.

The locking cog 84 includes a sloped surface 85. Surface 85 prevents the hook from pivoting or closing when the hook is in its open position because base 70 of the hook contacts surface 85, as shown in FIG. 8. When the fisherman pulls the locking cog down, the hook is then free to pivot and the hook may be rotated to its closed position shown in FIG. 6.

Surface 85 is sloped to allow the hook to rotate from its closed position to its open position without having to first move the locking cog. When the hook is opened, its base 70 contacts surface 85 and pushes it down as it slides along the surfaces slope or curve. Thus, stop 90 and locking cog 84 hold the hook in position when the hook is open, and prevent it from any further pivoting.

FIGS. 5–9 collectively demonstrates the extent of the hook's range of motion. As seen in FIG. 6, the closing or forward rotation of the hook is halted by the handle of the staff. As seen in FIG. 8, the opening or rearward rotation of the hook is limited by stop 90. When hook 52 is in its closed or retracted position, it actually contacts handle 20 at a point generally indicated at 54. In this embodiment, bracket 48 is machined or cast from aluminum and hook 52 is constructed from stainless steel. However, the bracket and hook may be constructed from other similarly sturdy materials without departing from the spirit and scope of the invention.

A major advantage of a wading staff with a retractable hook is the ability to retract or rotate the hook into a closed position so that it will not get in the fisherman's way when he doesn't need the hook to help him retrieve a fishing device. For instance, a retracted hook will not accidentally snare coils of fishing line that commonly float freely on the water while the fisherman is fishing nor will it catch on brush or branches as the fisherman moves along the bank.

In the preferred embodiments, a lock 26 shown in FIG. 3 allows the fisherman to twist the lower rod 12 and lock it into position, or untwist it and unlock the rod 12. The fisherman may use this lock 26 to secure or fix the desired length of the shaft. Preferably, the lock is an off-centered cam piece 27 with a locking plastic collar 29 that engages the inner surface of the upper rod 14 when twisted, but any known locking assembly may be used.

On the bottom of the lower rod 12 is a foot structure 28. When a person is wading in water using the staff as a stabilizing support, the person will place the foot structure 28 on a solid surface under the water to provide a firm base from which the person may maintain his balance. The foot structure is fictionally fit to cover the bottom of the lower rod 12 and may be replaceable with foot structures of various sizes to be used for different terrains. Preferably, the foot structure is rubber and similar to a crutch cap. However, the foot structure can be made of any material, especially elastomeric material.

FIG. 5 shows that the shaft may include a connector or lanyard ring assembly, generally indicated at 42 and which is preferably nickel plated. The assembly includes a first ring 42 held on the staff by an attachment ring 44 which passes through the first ring and encircles handle 20. Lanyard ring assembly 42 is held firmly to the staff because of the tension and friction caused by the attachment ring having a diameter slightly less than the diameter of handle 20 (which is preferably constructed from resilient material such as foam rubber). A fisherman may tie or clip the staff to himself or another object by using a lanyard rope or clip. With the staff tied to the fisherman (or his backpack, gear, etc.), the fisherman can release the staff to free both his hands and he does not have to worry about losing the staff. Also, when tied to the fisherman, the staff is easily grasped and transported.

FIG. 4 shows the invention being used to retrieve a snagged fishing device 30 from an overhanging branch 32 of a plant. A fisherman 34 takes the extensible staff and if the staff has a retracted hook, opens the hook so that it is unretracted and capable of hooking the branch. While holding the staff towards one end 36, the fisherman extends the staffs length. Once the fisherman has the staff a length sufficient to reach the branch 32 on which fishing device 30 is snagged, he hooks the hook 22, which is on the other end of the staff, over the branch 32, and pulls down the branch 32 so that he may retrieve the fishing device 30.

Alternatively, the fisherman may use the staff to free fishing devices snagged on rocks, branches or other obstacles under water. This is accomplished by taking the shaft, opening the hook, inserting the fishing line into the open hook and the closing the hook so that it encircles the fishing line. While holding the shaft towards the shaft's second end, the fisherman can extend the shaft along the fishing line to a length sufficient to reach the snagged fishing device. Once there, the fisherman can unsnag or dislodge the fishing device, or push against and move the obstacle. Once unsnagged, the fisherman can retrieving the fishing device by simple pulling it in.

A fisherman may also use the invented staff to hook and retrieve items of fishing gear dropped into the water or floating on the water. For example, the staff may be used to retrieve a net that was dropped into a stream, or a creel that is floating away downstream.

INDUSTRIAL APPLICABILITY

The invented wading staff and method of retrieving snagged fishing devices are applicable in any situation where a fisherman needs a staff for stabilizing support in water and an ability to retrieve snagged fishing devices. The staff and method are applicable to the flyfishing industry.

While the preferred embodiments of the invented wading staff with a retractable hook and method for retrieving snagged fishing devices have been disclosed, changes and modifications can be made without departing from the spirit of the invention.

I claim:

1. A wading staff for use by a person wading in water as a stabilizing support and as a tool to retrieve snagged fishing devices, the staff comprising:

an elongate shaft having a length, a first end, and a second end, wherein the shaft is extensible so that the length of the shaft is adjustable and wherein the second end may contact a surface under the water to support the person using the staff when wading in the water;

a handle on the first end so that a person wading in water may hold onto the shaft, where the handle wraps around the, shaft's first end and extends longitudinally on the shaft a distance sufficient to provide a surface to accommodate the person's hand;

a friction-causing structure on the second end to provide a base for the shaft when the staff is used during wading; and a retractable hook attached to the shaft adjacent the shaft's first end.

2. The wading staff of claim 1, wherein a magnetic element is adjacent the staffs first end, wherein the magnetic element has a magnetic field of sufficient strength to maintain contact between the element and ferrous metal of a fishing device.

3. The wading staff of claim 2, wherein the magnetic element is the hook.

4. A wading staff for use by a person wading in water as a stabilizing support and as a tool to retrieve snagged fishing devices, the staff comprising:

an elongate shaft having a length and a first end, the shaft being extensible so that the length of the shaft is adjustable, the shaft having a longitudinal axis and the shaft being tubular at its first end, the first end having an opening;

a bracket fitted within the opening;

a hinge joined to the bracket, the hinge having a rotational axis substantially perpendicular to the shaft's longitudinal axis; and a retractable hook attached to the shaft adjacent the shaft's first end, the hook including a base and being pivotally attached to the hinge to allow the hook to pivot about the hinge's rotational axis, the hinge further includes:
two arms joined to the bracket, wherein the two arms define a space therebetween and the hook's base is fitted in the space;
two collinear bores through the two arms and a corresponding bore through the hook's base;
a pin extending through the arms' bores and the base's bore, thereby pivotally attaching the hook to the bracket; and
a grommet positioned between the hook's base and one of the two arms extending from the bracket, wherein the pin extends through the arms' bores, the base's bore and the grommet.

5. A wading staff for use by a person wading in water as a stabilizing support and as a tool to retrieve snagged fishing devices, the staff comprising:
an elongate shaft having a length, a first end, and a second end opposite the first end, wherein the shaft is extensible so that the length of the shaft is adjustable and wherein the second end may contact a surface under the water to support the person using the staff when wading in the water;
a lock on the shaft to secure the shaft's length;
a handle on the shaft's first end so that a person wading in water may hold onto the shaft, where the handle wraps around the shaft's first end and extends longitudinally on the shaft a distance sufficient to provide a surface to accommodate the person's hand;
a friction-causing structure on the shaft's second end to provide a base for the shaft when the staff is used during wading; and
a hook attached to the shaft's first end and adjacent the handle for hooking an object on which a fishing device is snagged, thereby allowing the person using the staff to move the object to facilitate unsnagging of the fishing device, wherein the hook is mounted away from the second end so it will not contact objects during wading, and wherein the hook includes a blunt end.

6. The staff of claim 5, wherein the friction-causing structure comprises an elastomeric cap.

7. The staff of claim 5, wherein the shaft includes two telescoping rods.

8. The staff of claim 7, wherein the rods include a hollow upper rod and a lower rod and wherein the lower rod is configured to telescope into the upper rod.

9. The staff of claim 8, wherein the lock includes an off-centered cam piece with a locking collar that engages an inner surface of the hollow upper rod when the upper rod is twisted.

10. The staff of claim 5, wherein the handle is made of foam rubber.

11. A wading staff for use by a person wading in water as a stabilizing support and as a tool to retrieve snagged fishing devices, the staff comprising:
an elongate shaft means for providing support where the shaft means includes a first end, a second end opposite the first end and a length, wherein the shaft means is extensible so that the length is adjustable and wherein the second end may contact a surface under the water to support the person using the staff when wading in the water;
a lock means associated with the shaft means to secure the shaft's length;
grip means mounted on the shaft means' first end for facilitating grasping of the shaft means, where the grip means wraps around the shaft's first end and extends longitudinally on the shaft a distance sufficient to provide a surface to accommodate the person's hand;
a friction-causing means on the shaft means' second end to provide a base for the shaft means when the staff is used during wading; and
hook means attached to the shaft means' first end and adjacent the grip means for hooking an object on which a fishing device is snagged, thereby allowing the person using the staff to move the object to facilitate unsnagging of the fishing device; wherein the hook means is mounted away from the second end so it will not contact objects during wading.

12. A method of retrieving a snagged fishing device from an object, where the method is to be performed by a user while wading in water, comprising the steps of:
taking a wading staff including an extensible shaft with a length, a first end, a hook attached to the first end, a handle on the shaft's first end so that the user may hold onto the shaft while wading in water, where the handle wraps around the shaft's first end and extends longitudinally on the shaft a distance sufficient to provide a surface to accommodate the person's hand, a second end opposite the first end, and a friction-causing structure on the shaft's second end to provide a base for the shaft when the staff is used during wading, wherein the shaft is extensible so that the length of the shaft is adjustable, and wherein the hook is mounted away from the second end so it will not contact objects during wading;
holding the shaft towards the shaft's second end;
extending the shaft to a length sufficient to reach the object;
hooking the object with the hook;
pulling the object toward the user using the hook on the shaft's first end to hold the object while pulling;
retrieving the fishing device; and
releasing the hook.

13. A wading staff for use by a person wading in water as a stabilizing support and as a tool to retrieve snagged fishing devices, the staff comprising:
an elongate shaft having a first end and a second end opposite the first end, wherein the second end may contact a surface under water to support the person using the staff when wading in the water,
a handle on the shaft's first end so that a person wading in water may hold onto the shaft, where the handle wraps around the shaft's first end and extends longitudinally on the shaft a distance sufficient to provide a surface to accommodate the person's hand;
a friction-causing structure on the shaft's second end to provide a base for the shaft when the staff is used during wading; and
a hook attached to the shaft's first end and adjacent the handle for hooking an object on which a fishing device is snagged, thereby allowing the person using the staff to move the object to facilitate unsnagging of the fishing device, wherein the hook is mounted away from the second end so it will not contact objects during wading, and wherein the hook includes a blunt end.

14. The wading staff of claim 13, wherein the hook is retractable.

15. The wading staff of claim 14, further comprising a latch mechanism adjacent the hook and configured to limit the retracting of the hook from an open position to a closed position.

* * * * *